(12) United States Patent
Tseng et al.

(10) Patent No.: US 8,030,395 B2
(45) Date of Patent: Oct. 4, 2011

(54) PRESSURE SENSITIVE ADHESIVE DISPERSION HAVING HIGH SOLIDS AND LOW VISCOSITY AND METHOD OF MAKING SAME

(75) Inventors: Chi-Ming Tseng, Woodbury, MN (US); Margaret M. Sheridan, Woodbury, MN (US); Chih C. Hsu, Woodbury, MN (US); Chung I Young, Las Vegas, NV (US)

(73) Assignee: 3M Innovative Properties Company, St. Paul, MN (US)

( * ) Notice: Subject to any disclaimer, the term of this patent is extended or adjusted under 35 U.S.C. 154(b) by 1055 days.

(21) Appl. No.: 11/677,907

(22) Filed: Feb. 22, 2007

(65) Prior Publication Data

US 2008/0206558 A1 Aug. 28, 2008

(51) Int. Cl.
*C08K 3/20* (2006.01)
(52) U.S. Cl. ........ 524/516; 524/457; 524/458; 524/460; 524/522
(58) Field of Classification Search .................. 524/516, 524/522, 457, 458, 460
See application file for complete search history.

(56) References Cited

U.S. PATENT DOCUMENTS

| | | | |
|---|---|---|---|
| 6,048,611 | A | 4/2000 | Lu et al. |
| 6,225,401 | B1 | 5/2001 | Rehmer et al. |
| 6,566,441 | B1 | 5/2003 | Lohden et al. |
| 6,608,134 | B1 | 8/2003 | Tobing et al. |
| 6,706,356 | B2 | 3/2004 | Lee |
| 2001/0034394 | A1 | 10/2001 | Gleichenhagen et al. |
| 2003/0055150 | A1 | 3/2003 | Betremieux et al. |
| 2003/0109630 | A1 | 6/2003 | Smith et al. |

FOREIGN PATENT DOCUMENTS

| | | |
|---|---|---|
| DE | 24 55 133 | 5/1976 |
| JP | 6-116311 | 4/1994 |
| JP | 2001-323236 | 11/2001 |
| KR | 10-2008-0043926 | 5/2008 |

*Primary Examiner* — Bernard Lipman
(74) *Attorney, Agent, or Firm* — Jeffrey M Olofson

(57) ABSTRACT

A water-based pressure sensitive adhesive dispersion is provided. The dispersion is a reaction product of a monomer solution and an aqueous phase. The monomer solution contains from about 40 to 70 parts water-insoluble monomer selected from the group consisting of alkyl acrylate, methacrylate, vinyl ester, and combinations thereof and from about 0.01 to 0.2 parts monomer soluble free radical initiator. The aqueous phase includes from about 1 to 20 parts latex binder, from about 0.1 to 2 parts surfactant, from about 0.02 to 1 parts polymeric suspension stabilizer, and water as a remaining balance. All parts are given as parts by weight per 100 parts of the dispersion. The dispersion has a solid phase of at least 60 weight percent, a viscosity of less than about 300 centipoise, measured at about 23° C., and a bimodal particle size distribution.

17 Claims, 2 Drawing Sheets

PRESSURE SENSITIVE ADHESIVE DISPERSION HAVING HIGH SOLIDS AND LOW VISCOSITY AND METHOD OF MAKING SAME

FIELD OF INVENTION

The present invention pertains to a water-based pressure sensitive adhesive dispersion having high solids content of more than about 60% and a low viscosity of less than about 300 centipoise measured at about 23° C. The present invention also pertains to a method of making the dispersion and articles that include the dispersion as a component.

BACKGROUND

A desirable feature in water-based pressure sensitive adhesives (PSAs) is high solids content (typically greater than about 50% solids) and low viscosity so as to allow for efficient coating. Such a PSA composition can often translate into relatively low manufacturing cost. Because less water is present with high solids content, less energy is used to evaporate the water when drying a PSA coating. The result is a faster drying rate and higher line speed for coating the PSA composition. However, a high solids content composition may translate into a high viscosity composition. If the viscosity of the PSA composition is too high, coatability and processing of the PSA composition becomes very difficult.

Various techniques have been used in emulsion polymerization to afford latex PSAs of high solids content and relatively low viscosity. For example, U.S. Pat. No. 6,048,611 (Lu et al.) describes latex PSAs, produced via emulsion polymerization, having high solids content (about 40 to 70 weight percent solid phase) that is also moisture resistant. The latex PSA uses a relatively low amount (about 2 to 5%) of a low-molecular weight hydrophobic polymer in its monomer phase and a copolymerizable surfactant, which was used to improve cohesive strength and impart moisture resistance. U.S. Pat. No. 6,225,401 (Rehmer et al.) describes a process for producing readily filterable and deodorizable aqueous dispersions of PSA having solids content of more than 65%. The dispersions are prepared using emulsion feed techniques. U.S. Pat. No. 6,706,356 (Lee) describes emulsion polymerized PSA having high solids content (at least 68%) and a viscosity in the range of 300 to 15,000 centipoise prepared using split feed, delayed monomer addition technique to create a bimodal particle size distribution.

SUMMARY

In one aspect, the present invention pertains to a pressure sensitive adhesive dispersion comprising or consisting essentially of the reaction product of (a) a monomer solution comprising: from about 40 to 70 parts water-insoluble monomer selected from the group consisting of alkyl acrylate, methacrylate, vinyl ester, and combinations thereof, and from about 0.01 to 0.2 parts monomer soluble free radical initiator; and (b) an aqueous phase comprising: from about 1 to 20 parts latex binder, from about 0.1 to 2 parts surfactant, from about 0.02 to 1 parts polymeric suspension stabilizer, and water as a remaining balance.

In another aspect, the present invention pertains to a method of making a pressure sensitive adhesive dispersion comprising the steps of (a) mixing a monomer solution and an aqueous phase, wherein the monomer solution comprises or consists essentially of: from about 40 to 70 parts water-insoluble monomer selected from the group consisting of alkyl acrylate, methacrylate, vinyl ester, and combinations thereof, and from about 0.01 to 0.2 parts monomer soluble free radical initiator; and wherein the aqueous phase comprises: from about 0.1 to 2 parts surfactant, from about 0.02 to 1 parts polymeric suspension stabilizer, from about 1 to 20 parts latex binder; and water as a remaining balance; and (b) heating the monomer solution-aqueous phase mixture under an inert atmosphere.

In yet another aspect, in one application, the pressure sensitive adhesive dispersion is part of an article, such as a tape, a label, a wide format protective film, or a graphic film. The article comprises (a) a substrate having opposing first and second surfaces; and (b) a pressure sensitive adhesive disposed on the first side of the substrate, the pressure sensitive adhesive derived from a pressure sensitive adhesive dispersion comprising or consisting essentially of the reaction product of (i) a monomer solution comprising: from about 40 to 70 parts water-insoluble monomer selected from the group consisting of alkyl acrylate, methacrylate, vinyl ester, and combinations thereof, from about 0.01 to 0.2 parts monomer soluble free radical initiator, less than about 10 parts water-insoluble polar monomer, less than about 4 parts water-soluble polar monomer, and less than about 1 part water-insoluble crosslinking monomer; and (ii) an aqueous phase comprising: from about 1 to 20 parts latex binder, from about 0.1 to 2 parts surfactant, from about 0.02 to 1 parts polymeric suspension stabilizer, and water as a remaining balance.

In yet another aspect, the present invention pertains to a tape comprising (a) a substrate having opposing first and second surfaces; and (b) a pressure sensitive adhesive disposed on the first side of the substrate, the pressure sensitive adhesive derived from a pressure sensitive adhesive dispersion comprising or consisting essentially of the reaction product of (i) a monomer solution comprising: from about 50 to 65 parts isooctyl acrylate, from about 0.01 to 0.2 parts azo compound, peroxide, and combinations thereof, less than about 10 parts octyl acrylamide, less than about 4 parts acrylic acid, and less than about 1 part 1,6-hexanediol diacrylate; and (ii) an aqueous phase comprising: from about 1 to 20 parts acrylic latex binder, from about 0.1 to 2 parts ammonium lauryl sulfate, polyoxyethylene alkylphenyl ether, polyoxyethylene alkylphenyl propenyl ether, and combinations thereof, from about 0.02 to 1 parts polyacrylamide, less than about 0.002 parts hydroquinone, and water as a remaining balance.

As used herein, all "parts" are given as parts by weight per 100 parts of the dispersion. The phrase "water as a remaining balance" means that depending on the amounts of each component used in the monomer solution and aqueous phase, the balance to bring the monomer solution and aqueous phase to a total of 100 parts.

BRIEF DESCRIPTION OF THE DRAWINGS

The present invention can be further described with reference to the drawings, wherein.

Figure 1:
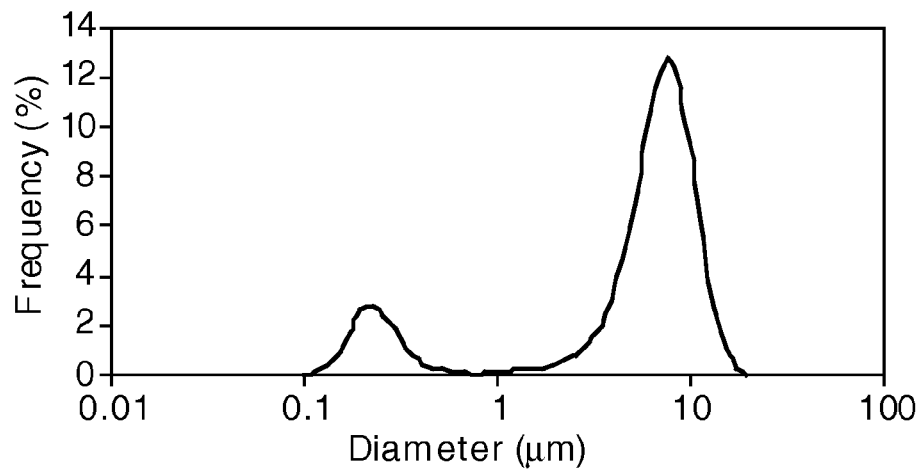
FIGS. 1 and 2 are graphs of Horiba particle size distributions showing bimodal distributions for Examples 1 and 6 respectively, described hereunder.

These drawings are idealized, are not drawn to scale, and are intended only for illustrative purposes.

DETAILED DESCRIPTION

The present invention pertains to a water-based PSA dispersion and a method of making the same. The method involves simultaneous micro-suspension (i.e., micron size) polymerization and seeded emulsion polymerization. A latex binder is used in an aqueous phase of a micro-suspension polymerization functioning as part of the aqueous phase and also providing seeds to grow a population of sub-micron particles. As explained in more details herein, after mixing, which may include homogenization, of a monomer solution and an aqueous phase, micron-size monomer droplets are formed along with monomer-swollen seed latex particles. Upon heating to initiate polymerization, micro-suspension polymerization proceeds along with seeded emulsion polymerization. The resulting inventive PSA dispersions exhibit bimodal particle size distribution, with a main population of particles in the range of about 1 to 15 microns (micrometers), from micro-suspension polymerization, and a smaller population in the range of about 0.1 to 0.5 microns, from seeded emulsion polymerization. The PSA dispersions also have high solids content (typically greater than about 65%) and low viscosity, typically less than about 300 centipoise (cps), as measured at about 23° C. using a Brookfield viscometer with a number two spindle. The monomer solution and aqueous phase are discussed below in detail.

Monomer Solution

The monomer solution includes the following components: (a) from about 40 to 70 parts water insoluble monomer selected from the group consisting of alkyl acrylate, methacrylate, vinyl ester, and combinations thereof, and (b) from about 0.1 to 2 parts monomer soluble free radical initiator. Optionally, the monomer solution further includes at least one of the following components: (c) less than about 10 parts water-insoluble polar monomer, (d) less than about 4 parts water-soluble polar monomer; and (e) less than about 1 part water-insoluble crosslinking monomer. Each of the components is further discussed below.

For component (a), suitable water insoluble monomer include, but are not limited to, isooctyl acrylate, 2-ethyl hexyl acrylate, butyl acrylate, isobornyl acrylate, methyl methacrylate, and isobornyl methacrylate. In one embodiment, the monomer solution includes from about 50 to 65 parts of this component (a). For component (b), suitable monomer soluble free radical initiator is selected from the group consisting of azo compound, peroxy compound, and combination thereof. In one embodiment, peroxy compounds, such as benzoyl peroxide, can be used alone or in combination with azo compounds. Exemplary azo compounds include, but are not limited to, Vazo 52, Vazo 64, and Vazo 67, which is azobis-2-methyl-butyronitrile, commercially available from DuPont Co., Wilmington, Del. For component (c), suitable water-insoluble polar monomers include N-containing monomers. Exemplary water-insoluble polar monomers include, but are not limited to, octyl acrylamide. For component (d), suitable water-soluble polar monomers include, but are not limited to, acrylic acid. And, for component (e), water-insoluble crosslinking monomer include multi-functional (i.e., di-, tri-, or tetra-) acrylates and methacrylates. An exemplary water insoluble crosslinking monomer includes, but is not limited to, hexanediol diacrylate.

Aqueous Phase

The aqueous phase includes the following components: (f) from about 1 to 20 parts latex binder; (g) from about 0.1 to 2 parts surfactant, (h) from about 0.02 to 1 part polymeric suspension stabilizer; and (i) water, typically deionized water, as a remaining balance to bring the monomer solution and aqueous phase to a total of 100 parts. Optionally, the aqueous phase further includes a water-soluble inhibitor. Each of these components is discussed in detail below.

For component (f), suitable commercially available latex binder has pressure sensitive adhesive properties. An exemplary latex binder is commercially available as product number Carbotac 26222, from Noveon. For component (g), conventional and or polymerizable surfactants can be used alone or in combination. Suitable conventional surfactants that can be used in the present invention include anionic, cationic, and non-ionic types. An exemplary conventional surfactant is Stepanol AMV, from the Stepan Co., Chicago, Ill. Conventional surfactants predominantly facilitate the micro-suspension polymerization. Polymerizable surfactants, used either alone or in combination with conventional surfactants, improve mechanical shear stability and electrolyte resistance of the inventive PSA dispersion. Exemplary polymerizable surfactants include Noigen RN-20 and Hitenol BC-10, which are, respectively, polyoxyethylene alkylphenyl propenyl ether and polyoxyethylene alkylphenyl propenyl ether ammonium sulfate. Both of these polymerizable surfactants are commercially available from DKS International, Inc., Japan. For component (h), suitable polymeric suspension stabilizers include synthetic water-soluble polymers and cellulose derivatives, which are used in the micro-suspension polymerization. Exemplary polymeric suspension stabilizers are those selected from the group consisting of polyacrylamide, polyacrylic acid, polyvinylpyrrolidone, and combinations thereof.

Method of Making

In one exemplary method, the PSA dispersion of the present invention includes the steps of (i) mixing the components to form the monomer solution described above, (ii) mixing the components to form the aqueous phase described above, (iii) mixing the monomer solution with the aqueous phase with the aid of mechanical mixer and or homogenizing the mixture to form a dispersion of droplets and swollen latex particles, and (iv) heating the dispersion under an inert atmosphere to initiate polymerization and convert the dispersion into the PSA dispersion.

In general, the degree of mixing and or homogenization can affect the particle size of the resulting PSA dispersion. In general, once the PSA dispersion is coated onto a substrate and dried to form a PSA product, the adhesion of the product increases with decreasing particle size of the PSA dispersion. The amount of adhesion increase, however, depends upon the substrate upon which the product is laminated or adhered. Suitable mechanical devices that can be used in the present invention to mix and or homogenize the PSA dispersion include pipeline mixer, colloid mill, and high speed rotor-stator type homogenizers, such as Gifford-Wood homomixer.

Applications

When the pressure sensitive adhesive dispersion of the present invention is used as part of a tape or label, the dispersion is typically coated on to a first side of a substrate (commonly referred to as a "backing.") Suitable substrates include paper-based and polymer-based films that may optionally be reinforced or contain other fillers, stabilizers, and processing aids (commonly referred to as "treated substrates"). To coat the PSA dispersion, any conventional coating method can be used, including, but not limited to, curtain coating, notch bar coating, gravure coating, and roll to roll transfer coating. The dispersion is dried on the substrate. Optionally, a low adhesion backsize or a release coating is disposed on a second side (opposing that of the first side) of the substrate allowing for easier unwind of the tape, i.e., easier as compared to when no release coating is used. Optionally, a primer is disposed on the first side of the substrate before coating the inventive PSA dispersion.

Figure 5:
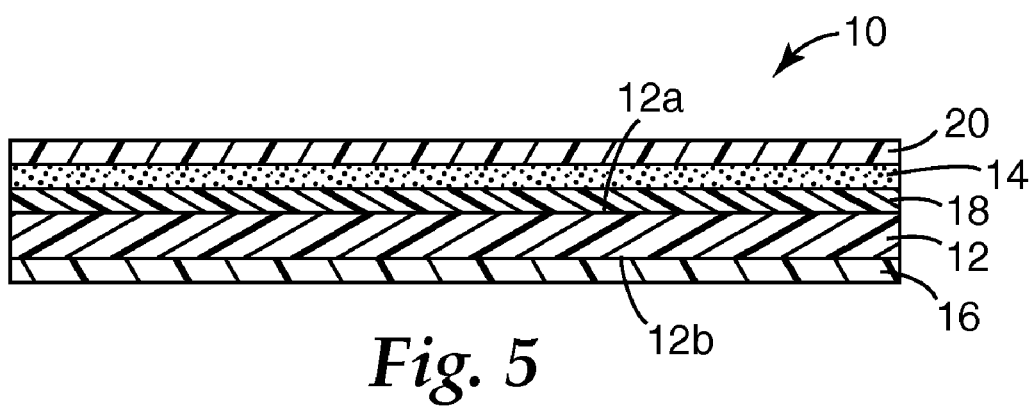
FIG. 5 is a cross-sectional view of one exemplary application of the present invention where the inventive PSA is used as part of a tape and or label.

FIG. 5 shows a cross-sectional view of an exemplary tape 10 with a substrate 12 having opposing first and second surfaces, 12a and 12b respectively. Disposed on the first surface of the substrate is a pressure sensitive adhesive 14 made or derived from a reaction product of the pressure sensitive adhesive dispersions described herein. Disposed on the second surface of the substrate is a release coating 16. And, sandwiched between the adhesive 14 and the first surface 12a is primer 18. Optionally, a release liner 20 is disposed over the adhesive 14.

The pressure sensitive adhesive dispersion of the present invention can be used in a wide variety of applications besides that of the tape and labels recited above. The inventive dispersion can be used in any application where adhesive properties are required, such as, but not limited to, in glues or liquid adhesives, in solid adhesives (such as glue sticks), and in cosmetic applications (such as hair mousse, gels, and the like, mascara) just to name a few. Other applications include uses of the pressure sensitive adhesive dispersion on a polymeric backing in graphic films, which contain indicia to communicate a message to a consumer or in a wide format, such as a protective film.

In a wide format product construction, in one exemplary method, the product can be made by coating the adhesive on to a release liner, which is then laminated to a primed substrate, with the adhesive in contact with the primer. Wide format films and wide format protective films are typically wider than 12 inches in width.

In applications such as glues, liquid adhesives, and glue sticks, the inventive pressure sensitive adhesive dispersion is a component of a formulation where adhesive properties are desired. The case is similar for cosmetic applications.

EXAMPLES

In the following examples, including the comparative examples, viscosity of the pressure sensitive adhesive dispersion was measured at room temperature of about 23° C. using a Brookfield viscometer equipped with a number two spindle. A volume-average particle size was determined using a Horiba LA-910 particle size analyzer.

Example 1

A monomer solution was made by mixing the components in the amounts (in grams) listed in Table 1 in a 1000 mL container equipped with a magnetic stirrer until a homogeneous solution was obtained.

An aqueous phase was made by mixing the components in the amounts listed in Table 1 in a 2000 mL container. The monomer solution was poured into the container with the aqueous phase and mixed with a mechanical stirrer at 500 rpm for 3 minutes. The mixture was then homogenized using a Gifford-Wood homomixer at 2000 rpm for 10 minutes.

The homogenized dispersion was poured into a 2-liter resin flask equipped with a thermometer, mechanical stirrer and nitrogen inlet tube. The homogenized solution was stirred at 400 to 500 rpm under a nitrogen blanket, heated to 60° C. for 2 hours and then raised to and maintained at 75° C. for 4 hours, and then cooled and filtered through cheesecloth. Using the Horiba particle size analyzer, the pressure sensitive adhesive dispersion had a bimodal distribution, with a first peak centering around 0.23 micrometer and a second peak (a larger peak as compared to the first peak) centering around 7.0 micrometers, as shown in FIG. 1.

Example 2

The pressure sensitive adhesive dispersion was prepared similarly to Example 1 except Vazo 67 omitted and the Luperox A 75 doubled to 0.4 grams. Each component amount (in grams) is listed in Table 1. The Horiba analyzer gave a bimodal particle size distribution.

Example 3

The pressure sensitive adhesive dispersion was prepared similarly to Example 1 except HDDA was omitted. Each component amount (in grams) is listed in Table 1. The Horiba analyzer gave a bimodal particle size distribution.

Example 4

The pressure sensitive adhesive dispersion was prepared similarly to Example 1 except the homogenization step was omitted. The aqueous phase and monomer solution were mixed in the 2-L resin flask with a mechanical stirrer operating at 600 rpm for 30 minutes under nitrogen then heated to 60° C. to start polymerization. Each component amount (in grams) is listed in Table 1. The Horiba analyzer gave a bimodal particle size distribution.

Example 5

A monomer solution and aqueous phase were prepared similarly to Example 1 with each component amount (in grams) listed under Example 5 in Table 1.

The monomer solution was poured into the beaker containing the aqueous phase and mixed with a mechanical stirrer at 500 rpm for 3 minutes, then homogenized with a Gifford-Wood homomixer at 2000 rpm for 10 minutes. The homogenized dispersion was then poured into a 2-liter resin flask equipped with a thermometer, mechanical stirrer, and nitrogen inlet tube. The reaction mixture was stirred at 400 to 500 rpm under a nitrogen blanket and heated to 60° C. After 50 minutes, the batch exothermed to 78° C. with cooling by an air gun on the outside of the resin flask. The reaction was maintained at 75° C. for 4 hours, cooled, and filtered through cheesecloth to yield the resulting dispersion. The Horiba analyzer gave a bimodal particle size distribution with a first peak at around 0.36 micrometers and a second peak (larger in size as compared to the first peak) at around 8.5 micrometers.

Example 6

Figure 2:
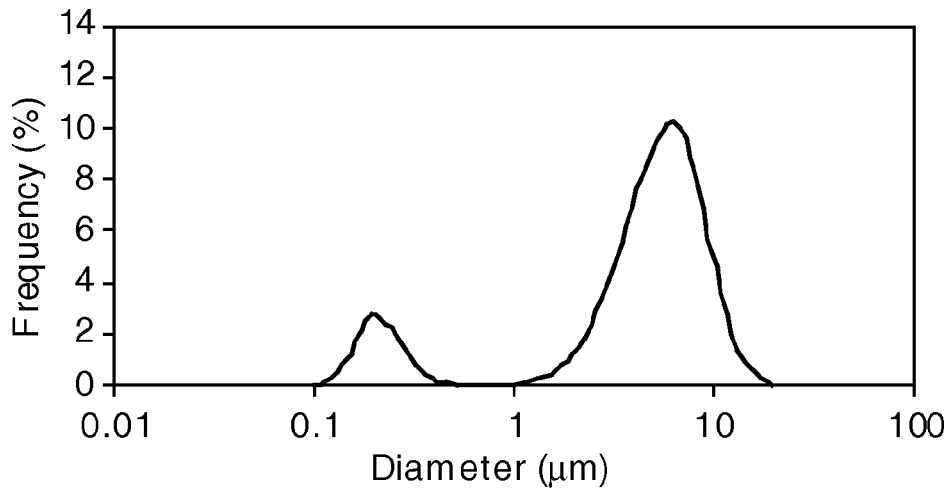

A pressure sensitive adhesive dispersion was prepared similarly as in Example 1 with each component amount (in grams) listed under Example 6 in Table 1. The Horiba analyzer gave a bimodal particle size distribution with a first peak at around 0.2 micrometer and a second peak (larger in size as compared to the first peak) at around 6.3 micrometer, as shown in FIG. 2.

Example 7

A monomer solution was prepared similarly to Example 1 with each component amount (in kilograms) listed under Example 7 in Table 1 in a 75-gallon reactor.

When all of components in the monomer solution were dissolved and a homogenous solution was obtained, the agitator was stopped. The aqueous ingredients as listed in Table 1 under Example 7 were added into the reactor. For this example, a 19.7 weight percent aqueous solution of Noigen RN-20 was used. The agitator was restarted and maintained at 120 rpm.

The mixture in the reactor was passed through a Gifford-Wood pipeline mixer and cycled back into the reactor for a total of two hours. The homogenized solution was purged with nitrogen, sealed with 25 pounds per square inch of nitrogen and heated to 56 to 60° C. After 2.5 hours of induction, the batch exothermed to 99° C. in 30 minutes with jacket cooling. After exotherm peaked, the batch was maintained at 75° C. for 4 hours, cooled, and filtered through a 40-mesh screen to yield a pressure sensitive adhesive dispersion. The Horiba analyzer gave a bimodal particle size distribution with a first peak at around 0.23 micrometers and a second peak (larger in size as compared to the first peak) at about 2.6 micrometers.

Comparative Example 1

This example illustrates the effects of blending a latex binder (Carbotac 26222) instead of using it as part of an aqueous phase in a reaction product, as described above in Examples 1 to 7.

Figure 3:
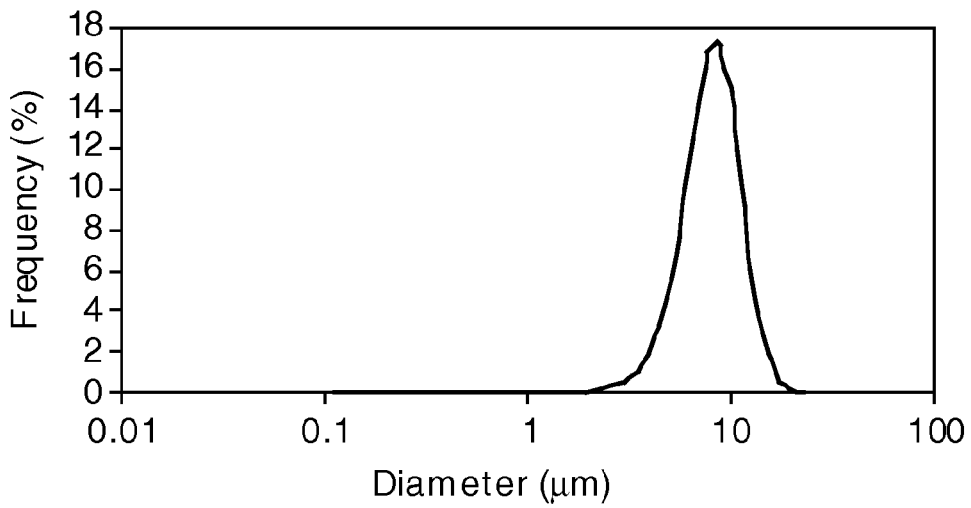
FIGS. 3 and 4 are graphs of Horiba particle size distributions showing unimodal distributions for Comparative Examples 1 and 2 respectively, described hereunder.

A pressure sensitive adhesive dispersion was prepared similarly to Example 1 except that Carbotac 26222 was replaced by 68 gram deionized water. The Horiba analyzer gave a unimodal particle size distribution with a volume average particle size of 7.8 micrometers, as shown in FIG. 3.

Blending 100 grams of the dispersion with 7.4 gram Carbotac 26222 (same latex binder to dispersion ratio as that of Example 1) did not give a bimodal particle size distribution as in Example 1.

Comparative Example 2

Figure 4:
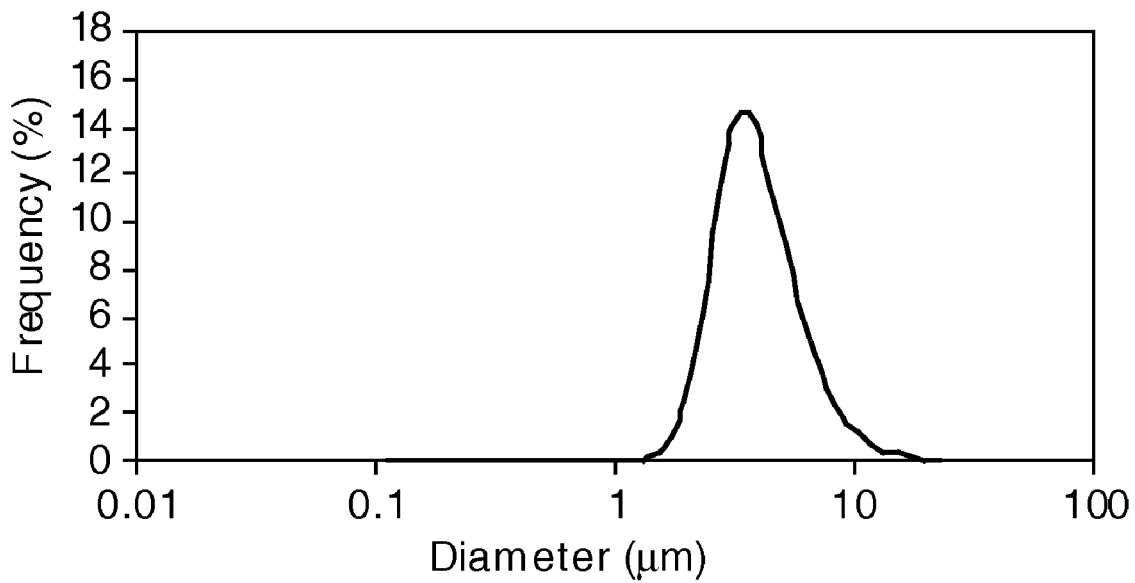

A pressure sensitive adhesive dispersion was prepared similarly to Example 6 except that Carbotac 26222 was replaced by 77 gram deionized water. The Horiba analyzer gave a unimodal particle size distribution with a volume average particle size of 4.0 micrometers, as shown in FIG. 4.

Blending of 100 gram of the dispersion with 10.4 grams of Carbotac 26222 (same latex binder to dispersion ratio as that of Example 6) did not give a bimodal particle size distribution as in Example 6.

TABLE 1

| | Ex. 1 (g) | Ex. 2 (g) | Ex. 3 (g) | Ex. 4 (g) | Ex. 5 (g) | Ex. 6 (g) | Ex. 7 (kg) | C1 (g) | C2 (g) |
|---|---|---|---|---|---|---|---|---|---|
| Monomer solution | | | | | | | | | |
| OACM[1] | 24 | 24 | 24 | 24 | 49 | 49 | 6.86 | 24 | 49 |
| AA[2] | 3 | 3 | 3 | 3 | 10.3 | 10.3 | 0.85 | 3 | 10.3 |
| IOA[3] | 578 | 578 | 578 | 578 | 546 | 550 | 165.89 | 578 | 550 |
| HDDA[4] | 3.8 | 3.8 | 0 | 3.8 | 3.8 | 0 | 1.11 | 3.8 | 0 |
| Vazo 67[5] | 0.16 | 0 | 0.16 | 0.16 | 0.16 | 0.16 | 0.046 | 0.16 | 0.16 |
| L A75[6] | 0.20 | 0.40 | 0.20 | 0.20 | 0.20 | 0.20 | 0.059 | 0.20 | 0.20 |
| Total | 609.16 | 609.20 | 605.36 | 609.16 | 609.46 | 609.66 | 174.8 | 609.16 | 609.66 |
| Aqueous phase | | | | | | | | | |
| $H_2O$[7] | 220 | 220 | 220 | 220 | 250 | 240 | 62.72 | 288 | 317 |
| AMV[8] | 8.5 | 8.5 | 8.5 | 8.5 | 8.5 | 8.5 | 2.45 | 8.5 | 8.5 |
| 1025[9] | 3.1 | 3.1 | 3.1 | 3.1 | 3.1 | 3.1 | 0.88 | 3.1 | 3.1 |
| RN-20[10] | 6.8 | 6.8 | 6.8 | 6.8 | 6.8 | 6.8 | 2.5 | 6.8 | 6.8 |
| HQ[11] | 0.004 | 0.004 | 0.004 | 0.004 | 0 | 0.004 | 0.0013 | 0.004 | 0 |
| N300[12] | 35 | 35 | 35 | 35 | 35 | 35 | 10.09 | 35 | 35 |
| C26222[13] | 68 | 68 | 68 | 68 | 97 | 97 | 19.54 | 0 | 0 |
| Total | 341.40 | 341.40 | 341.40 | 341.40 | 400.4 | 390.4 | 98.18 | 341.40 | 370.4 |
| Solids[14] | 69.8 | 67.6 | 68.1 | 68.4 | 67.3 | 67.0 | 67.3 | 67.5 | 65.3 |
| Viscosity[15] | 165 | 143 | 140 | 200 | 170 | 120 | 184 | 1,300 | 370 |
| Particle size | bimodal | bimodal | bimodal | bimodal | bimodal | bimodal | bimodal | unimodal | unimodal |

[1] octyl acrylamide, from National Starch
[2] acrylic acid, from Dow Chemical
[3] isooctyl acrylate, from 3M Company, St. Paul, MN
[4] 1,6-hexanediol diacrylate, from Sartomer.
[5] azobis-2-methyl-butyronitrile, from DuPont
[6] benzoyl peroxide with 25% weight water, from ATOCHEM
[7] deionized water
[8] Stepanol AM-V, ammonium lauryl sulfate, 28% solids solution, from Stepan Company, Chicago, IL
[9] Hitenol BC-1025, polyoxyethylene alkylphenyl ether, 25% solids solution in water, from DKS International
[10] 25% aqueous solution of Noigen RN-20, polyoxyethylene alkylphenyl propenyl ether, from DKS International, except in Example 7 where a 19.7% aqueous solution was used
[11] hydroquinone, from Eastman Chemical Products
[12] 1% aqueous solution of Cyanamer N-300, polyacrylamide, from Cytec Industries
[13] Carbotac 26222, acrylic latex binder, 51% solids, from Noveon
[14] percent solids of the pressure sensitive adhesive dispersion
[15] viscosity in centipoise

What is claimed is:

1. A method of making a pressure sensitive adhesive dispersion comprising:
   mixing a monomer solution and an aqueous phase, wherein the monomer solution comprises
      from about 40 parts to about 70 parts water-insoluble monomer selected from the group consisting of alkyl acrylate, methacrylate, vinyl ester, and combinations thereof, and from about 0.01 part to about 0.2 parts monomer soluble free radical initiator, and wherein the aqueous phase comprises
         from about 0.1 part to about 2 parts surfactant, from about 0.02 part to about 1 parts polymeric suspension stabilizer, from about 1 part to about 20 parts latex binder; and water as a remaining balance, wherein all parts are given as parts by weight per 100 parts of the dispersion; and
   heating the monomer solution-aqueous phase mixture under an inert atmosphere.

2. The method of claim 1, wherein the dispersion has a solid phase of at least 60 weight percent.

3. The method of claim 1, wherein the dispersion has a viscosity of less than about 300 centipoise measured at about 23° C. using a Brookfield viscometer with a number two spindle.

4. The method of claim 1, wherein the dispersion has a bimodal particle size distribution with a first volume average particle size of from about 0.1 micrometer to about 0.5 micrometer and a second volume average particle size of from about 1 micrometer to about 15 micrometer.

5. The method of claim 1, wherein the monomer solution further comprises less than about 10 parts water-insoluble polar monomer.

6. The method of claim 5, wherein the water-insoluble polar monomer is octyl acrylamide.

7. The method of claim 1, wherein the monomer solution further comprises less than about 4 parts water-soluble polar monomer.

8. The method of claim 7, wherein the water-soluble polar monomer is acrylic acid.

9. The method of claim 1, wherein the monomer solution further comprises less than about 1 part water-insoluble crosslinking monomer.

10. The method of claim 9, wherein the water-insoluble crosslinking monomer is selected from the group consisting of multi-functional acrylate and multi-functional methacrylate.

11. The method of claim 9, wherein the water-insoluble crosslinking monomer is hexanediol diacrylate.

12. The method of claim 1, wherein the aqueous phase further comprises less than about 0.002 parts water-soluble inhibitor.

13. The method of claim 12, wherein the water-soluble inhibitor is hydroquinone.

14. The method of claim 1 wherein (i) the alkyl acrylate is selected from the group consisting of isooctyl acrylate, 2-ethyl hexyl acrylate, butyl acrylate, isobornyl acrylate, and combinations thereof, and (ii) the methacrylate is selected from the group consisting of isobornyl methacrylate, methyl methacrylate, and combination thereof.

15. The method of claim 1, wherein the polymeric suspension stabilizer is selected from the group consisting of water-soluble polymers and cellulose derivatives.

16. The method of claim 1, wherein the polymeric suspension stabilizer is selected from the group consisting of polyacrylamide, polyacrylic acid, polyvinylpyrrolidone, and combinations thereof.

17. The method of claim 1, wherein the surfactant is selected from the group consisting of (i) conventional surfactants selected from the group consisting of anionic, cationic, non-ionic surfactants, and combinations thereof and (ii) polymerizable surfactants selected from the group consisting of polyoxyethylene alkylphenyl propenyl ether, polyoxyethylene alkylphenyl propenyl ether ammonium sulfate, and combinations thereof.

* * * * *

UNITED STATES PATENT AND TRADEMARK OFFICE
CERTIFICATE OF CORRECTION

| | | |
|---|---|---|
| PATENT NO. | : 8,030,395 B2 | Page 1 of 1 |
| APPLICATION NO. | : 11/677907 | |
| DATED | : October 4, 2011 | |
| INVENTOR(S) | : Chi-Ming Tseng | |

It is certified that error appears in the above-identified patent and that said Letters Patent is hereby corrected as shown below:

<u>Column 3</u>
Line 31, Delete "thereof" and insert in place thereof -- thereof; --.

Signed and Sealed this
First Day of May, 2012

David J. Kappos
*Director of the United States Patent and Trademark Office*